United States Patent [19]

Jacques

[11] 4,287,876
[45] Sep. 8, 1981

[54] SOLAR HEATING PANEL UNIT AND SYSTEM THEREFOR

[75] Inventor: Pierre Jacques, Huntington, N.Y.

[73] Assignee: Cellu-Craft Products Company, New Hyde Park, N.Y.

[21] Appl. No.: 96,065

[22] Filed: Nov. 20, 1979

[51] Int. Cl.³ .............................................. F24J 3/02
[52] U.S. Cl. .................................... 126/426; 126/445
[58] Field of Search .............. 126/422, 423, 426, 427, 126/432, 435, 444, 445, 450; 165/46; 285/206, 161

[56] References Cited

U.S. PATENT DOCUMENTS

| | | | |
|---|---|---|---|
| 2,580,818 | 1/1952 | Mundy et al. | 285/205 |
| 3,022,781 | 2/1962 | Andrassy | 126/426 |
| 4,038,967 | 8/1977 | Stout et al. | 126/426 |
| 4,143,644 | 3/1979 | Heitland et al. | 126/444 |
| 4,146,012 | 3/1979 | Elkins | 126/426 |
| 4,191,166 | 3/1980 | Saarem et al. | 126/430 |

Primary Examiner—James C. Yeung
Attorney, Agent, or Firm—Posnack, Roberts, Cohen & Spiecens

[57] ABSTRACT

A solar heating panel unit is provided in the form of a plastic pouch having an internal chamber provided with a serpentine path. The pouch has two sides, one of which consists of a layer of anti-abrasive matte black plastic and a sealant inner layer of black medium density polyethylene film. The other side incorporates a reflective layer of aluminum foil. The pouch has inlets and outlets, whereat hardware fixtures are employed, consisting of threadably engaged parts having flanges between which is clamped a wall of the pouch. The pouch, or a plurality of such pouches, may be incorporated into systems wherein a cold water source is connected selectively through the pouch to a tank or through a boiler, whereof the boiler or the tank supplies a construction requiring heated water. Alternatively, the system may be such that the tank is excluded.

14 Claims, 6 Drawing Figures

SOLAR HEATING PANEL UNIT AND SYSTEM THEREFOR

FIELD OF INVENTION

This invention relates to solar heating panel units and to systems for incorporating the same.

BACKGROUND

The sun emits a constant stream of radiant energy. The amount of solar energy directed towards the earth equals the energy that might be produced by burning approximately one-half a trillion tons of coal, which is the amount of coal which might be dug in the United States in about one thousand years at the present rate of mining. Enough solar energy falls on the United States every twenty minutes to fill the country's present power needs for approximately one year.

In order to be an effective source of power, solar energy has to be collected, and substantial developmental work has been done with respect to collective solar energy for the purpose of heating and/or air-conditioning constructions. Solar energy has also been used to furnish power for telephone lines, to cook foods, to heat water for swimming pools, to provide heat for testing metals, and so forth.

In general, it is noted that for the purpose of heating constructions, a collector may be mounted, which is directionally oriented, so that maximum solar energy is received. The sun heats water or air circulating through the collector and such heated water is directly used or stored in an insulated tank. Much developmental work has also been done in connection with the interception of solar energy and the collection of such energy for useful purposes and much of this developmental work has resulted in the issuance of patents.

Stella Andrassy discloses, in U.S. Pat. No. 3,022,781, a solar fluid heater unit having two flexible film members secured to each other adjacent their periphery and further secured to each other in pre-selected regions internally of the periphery to provide a serpentine passageway for fluid with the object in mind to provide a solar fluid heater unit which is light in weight, readily collapsed for transportation and storage, and easily and economically fabricated. The layers may be made from two separate pieces of flexible plastic film or from a single flattened tube of flexible plastic film.

Yoshimatsu Okuda discloses, in U.S. Pat. No. 3,029,806, a bag-shaped water tank having a sealed portion at the perimetric edge thereof and formed of two or more sheets of polyvinyl chloride bonded together in such a manner that there is no possibility of an accident occurring as a result of bursting under normal conditions of use as a solar hot water heater. Therein is provided a water supply and discharge port which functions both as the supply inlet for supplying water to the tank, as well as the discharge outlet for the discharge of water therefrom.

E. Konopka discloses, in U.S. Pat. No. 3,868,945, a heat exchanger for warming the water in a swimming pool by solar heat by the use of rectangular sheets of black matte finish flexible film plastic sealed together so as to form a closed perimeter and having an inlet passage and an outlet passage and a sinuous flow path consisting of a plurality of straight parallel elongated flow channels formed between the inlet and the outlet. At a plurality of points along each straight flow channel, the two plastic sections are heat sealed together to form obstacles to the straight flow path, creating zones of turbulence which enhance the efficiency of the heat exchange. Grommet holes are employed to support the heat exchanger on appropriate hangers. A flow diverter valve is provided which includes a plastic T-section incorporating an arm having a leg section adjoining at right angles.

As will appear more fully hereinafter, the above pouch or bag constructions do not develop the advantages of the invention, which, therefore, constitutes an improvement over the known prior art.

SUMMARY OF INVENTION

It is an object of the invention to provide an improved solar heating panel unit, having improved heat transfer and heat collectibility characteristics.

It is a further object of the invention to provide improved systems for solar heating panel units.

Another object of the invention is to provide improved solar heating panel units with improved durability and shelf life.

Yet, another object of the invention is to provide improved solar heating panel units adapted for use with potable water sources.

Another object of the invention is to provide improved solar heating panel units susceptible of ready manufacture with mass production techniques and adapted for being manufactured with standard heat seal techniques and thereby capable of being manufactured with readily available equipment.

Still another object of the invention is to provide improved solar heating panel units which are economical and can be manufactured at a fraction of the cost of units presently on the markets.

Still another object of the invention is to provide improved solar panel units, having the ability to withstand freezing and, therefore, useful under a wide variety of circumstances.

Another object of the invention is to provide improved solar heating panel units which are of light weight and consequently are easy to transport.

In achieving the above and other objects of the invention, there is provided a solar heating panel unit comprising first and second sides connected together along an at least substantially endless path to form a pouch having an internal chamber adapted to accommodate a heat transfer fluid, and access means coupled to at least one of said sides for the supply and removal of said fluid to and from said chamber, said first side including a layer of black polyester, said second side including a lamination of reflective foil and plastic, said foil facing said chamber.

According to a more specific aspect of the invention, the first side mentioned above includes a layer of polyethylene on said layer of polyester and facing the aforesaid chamber. In addition, the second side includes a layer of polyethylene on said foil and also facing the aforesaid chamber.

The aforesaid polyethylene may be U.V. treated medium density black polyethylene film. The plastic of the second side and the polyester of the first side may be of U.V. treated P.E.T. The foil may be, for example, aluminum having a thickness in the range of about 0.0003 inches. A polyurethane adhesive is employed for bonding the layers of polyethylene and polyester, as well as the foil.

According to a feature of the invention, an opening is provided through the first and second sides in a position spaced from the chamber to provide for the mounting of the aforesaid pouch. Connecting means may be provided in the chamber connecting the first and second sides to define a serpentine path in the chamber for the flow of fluid.

Access means of the invention may include inlet and outlet fixtures coupled to the aforesaid pouch and including engaged members comprising flanges sandwiching one of the aforesaid sides there between. Said members define a bore communicating with the aforesaid chamber. One of these members extends into the chamber and includes therein a cylindrical part spacing the sides and provided with radial openings connecting the bore with the chamber. The connecting means mentioned above may be especially located as to isolate substantially the access means from the chamber.

In accordance with the invention, a system is provided for supplying heated water to a construction, the system comprising at least one unit as defined hereinabove and described in greater detail hereinafter, there being furthermore provided source means for supplying cold water, heating means for heating water with localized heating, coupling means for coupling said unit and heating means to said construction, and thermostatically controlled means for selectively coupling said source means to said heating means or said unit.

As an alternative to the above, there may be provided a storage tank coupled to the aforesaid unit, with coupling means for coupling said tank and heating means to said construction, the thermostatically controlled means selectively coupling the source means to the heating means or said tank. In the latter system, there may be provided discharge means coupled to the tank and thermostatic means to control the coupling of said unit to said tank and said discharge means to replace water in said tank with water from said unit when the water in said unit is warmer than the water in the tank by a predetermined temperature difference.

The above and other objects and features of the invention will be found in the detailed description which follows hereinafter as illustrated in the accompanying drawing.

DETAILED DESCRIPTION

This invention focuses in on solar heating panel units manufactured from flexible materials. The materials are preferably laminations of various plastics to produce a heating panel which can be utilized to heat liquids for various purposes. In accordance with the invention, the top or upper side of the panel is preferably made of a lamination that is black, dull and translucent. The bottom or lower lamination is preferably reflective and strong. The materials employed are such as to produce weatherability and puncture resistance with respect to the normal use thereof. The panel is preferably manufactured in such a way that the top and bottom laminations are sealed together and baffles are employed to allow the fluid to travel therethrough in a serpentine or circuitous route to give maximum exposure to solar radiation. An entry and exit are provided in the pouch and the heated fluid from the pouch travels to a heat exchanger or heat storage chamber or the like.

The pouch provided in accordance with the invention has the capability of being utilized in solar heating systems. Since the pouch is a flexible item as opposed to a rigid item, it requires support. However, it is designed to be supported on roofs at relatively small angles and to be fixed to such roofs by saddles or by appropriate hangers operating in conjunction with grommet holes provided in the pouch of the invention. The flexible pouch provided in accordance with the invention does not dent or deform as would aluminum and it does not break, such as would a glass envelope or plastic sheeting or the like.

Figure 1:
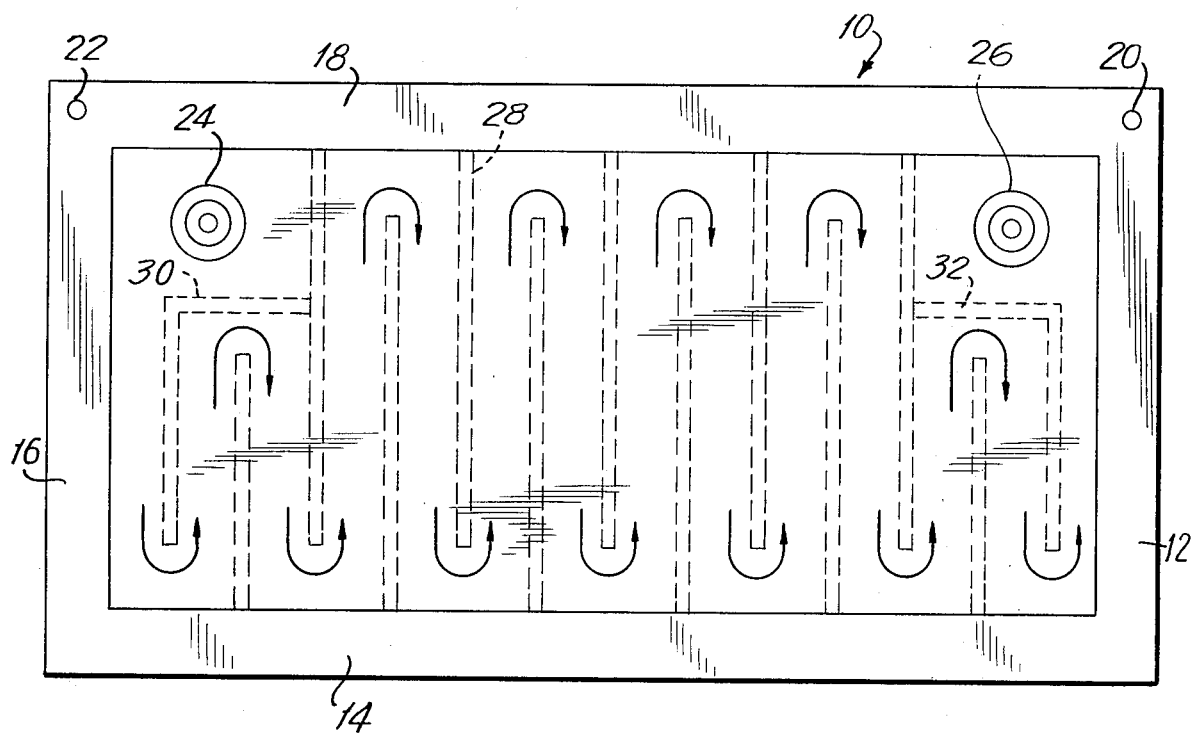
FIG. 1 is a diagrammatic view of a pouch constituting a solar heating panel unit provided in accordance with the invention.

A pouch of the invention is indicated in FIG. 1 at 10. It includes peripheral sections 12, 14, 16 and 18 which as will be shown are the connected edges of the top and bottom sides of the pouch.

The peripheral sections may be provided with one or more grommet holes, such as indicated at 20 and 22. The purpose of these holes is to provide a support for the pouch, which may then be attached to hangers such as hooks provided, for example, on the roof of the construction utilizing the heat exchange capabilities afforded by the pouch 10.

Figure 2:
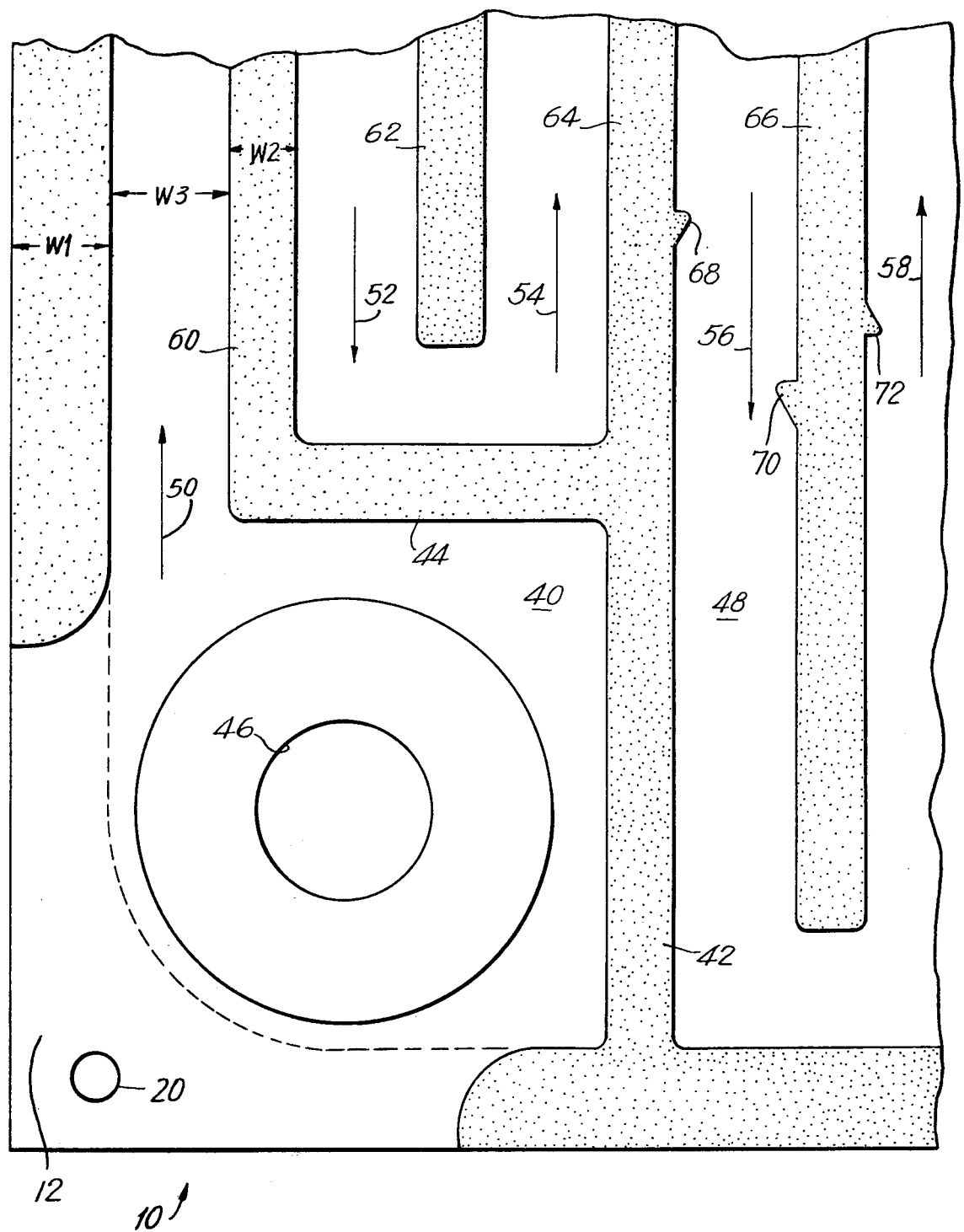
FIG. 2 is a fragmentary view of the unit, partially broken away to illustrate the access opening employed to constitute an inlet or outlet and also illustrating the serpentine path provided in accordance with the invention.

Also illustrated in FIG. 1 are the inlet fixture 24 and the outlet fixture 26, the details of which will be shown hereinbelow. FIG. 1 also illustrates the connections between the top and bottom sides of the pouch and which are illustrated at 28. These connections or heat welds define a serpentine path within the pouch, whereby to maximize the exposure of the fluid entering the pouch before this fluid leaves the pouch for heat transfer purposes. It will also be noted that the connections are particularly designed as indicated at 30 and 32 to extend transversely of connection lines 28 in proximity to inlet and outlet fixtures 24 and 26 to provide sub-chambers at least substantially isolated from the main chamber of the pouch and by which fluid flow is diverted between the fixtures 24 and 26 and the serpentine path of the main chamber of the pouch. The sub-chambers accommodate and isolate the inlet and outlet fixtures. FIG. 2 illustrates on enlarged scale a fragmentary portion of the pouch 10, wherein it can be seen that the connected periphery of the pouch has a width W1 which preferably, in accordance with the invention, is of a magnitude of about three-quarters of an inch. The sub-chamber referred to above for the access hardware is indicated at 40 and is bounded by walls 42 and 44 formed from welds of the plastic layers or sides which are effected in the normal manner of known heat seal techniques applied in the plastic industry.

FIG. 2 also illustrates the access hole 46 which is provided in one side of the pouch, which is preferably the upper side, and to which coupling is effected by means of hardware fixtures to be indicated in greater detail hereinbelow. It will be noted in FIG. 2 that opening 20, for example, is provided in the peripheral weld 12, so as to be completely incorporated therein, whereby no access is afforded through opening 20 into the main chamber of the pouch indicated at 48 or into the sub-chamber 40.

It will be noted that treating opening 46 as an inlet opening, fluid passes in the direction indicated by arrow 50 and subsequently in the directions indicated by arrows 52, 54, 56 and 58 by means of passages formed, for example, by welds or the resulting walls indicated, for example, at 60, 62, 64 and 66 and so on. The opposite end of the pouch 10 is a mirror reflection of what is illustrated in FIG. 2.

According to the invention, turbulence knobs, such as indicated at 68, 70 and 72, may be formed on the aforesaid walls. The purpose of these knobs is to interrupt a smooth flow of the fluid passing through the pouch in order to cause turbulence and to further amplify the time in which the fluid is exposed to solar radiation.

The walls 60, 62, 64 and 66, as well as the remainder of the walls, preferably have a thickness W2, having an order of magnitude of about one-half of an inch. The width W3 of the various channels in the serpentine paths has an order of magnitude of about one inch.

Figure 3:
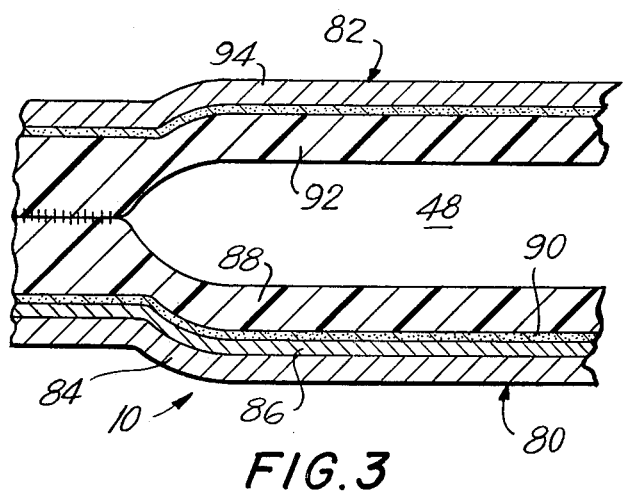
FIG. 3 is a diagrammatic cross-section of the unit of FIG. 1, illustrating the laminations employed therein.

FIG. 3 is a diagrammatic view of a cross-section of the pouch, from which it will be seen that the pouch 10 has a bottom side 80 and an upper side 82. The function of the bottom side is to provide strength, as well as reflectability of solar radiation back into the chamber 48. The function of the upper side 82 is to provide for efficient and effective absorption of solar radiation and a passing of this radiation or heat into the chamber 48.

Side 80 consists, for example, of a clear glossy layer of polyester, such as polyethylene terephthalate which is a strong anti-abrasive layer. Some example details of this layer will be indicated hereinbelow. The layer is indicated at 84. Attached thereto in a lamination is a reflective layer 86 constituted, for example, by an aluminum foil, having a thickness in the order of 0.0003 inches. Further details thereof will be provided below. It will be noted that the foil 86 faces the chamber 48. It will be moreover noted that the foil is covered by a layer 88 constituted, for example, by a black medium-density polyethylene film, which is U.V. treated and which constitutes a sealant layer bounding the chamber 48, so that the pouch can be used, for example, with potable water sources for potable water usage. It will be noted further that the layer 88 is connected to the foil by an adhesive layer 90 which, for example, may be constituted by a polyurethane adhesive M-333.

The upper side of the pouch is constituted, for example, by a layer also of black medium density polyethylene film, U.V. treated to complete the inner wall, such as indicated at 92. Thus, the inner layer of the pouch is a polyethylene similar to that used in milk bottles and the like, so that the pouch of the invention can be employed under sanitary conditions.

The outer layer 94 of the top side is constituted, for example, of an anti-abrasive matte black layer of polyester, such as polyethylene terephthalate, which is U.V. treated. The function of the outside layer, as well as the inner layer 92, is to transfer solar radiation with a maximum effectiveness and efficiency into the chamber 48. It will therefore be noted that the top side 82 is translucent to solar radiation, even though the layers thereof are preferably formed with a plastic which is inherently black due to the incorporation of black pigments or which is printed black by the utilization of a suitable black ink, as is well known in the plastic industry.

The following table indicates materials specifically to be employed within the scope of the invention:

TABLE

| SOLAR HEATING PANEL | | ITEM | |
|---|---|---|---|
| MATERIALS | BASIS WEIGHT | GAUGE | REMARKS |
| A. Clear PET | 10.3 | 50g | 50 LBT |
| Clear PE film | 28.8 | 200g | E LFL 4 |
| B. Matte Black PET | 20.6 | 100g | Martin 100 BM |
| Black PE film* | 86.4 | 600g | Turex LGFB |
| C. Clear PET | 20.6 | 100g | Martin 100 CC |
| Aluminum Foil | 13.6 | .0003 | Alumex .0003 Lam |
| Black PE Film* | 86.4 | 600g | Turex LGFB |

*Substitute: PE/Surlyn Co-ex

In the above, materials B indicate layer 82 in FIG. 3, whereas, materials C indicate the layers of side 80. Materials A indicate a possible third layer which would only be tacked down on the edges and various places within the structure, in order to form a "hot house" effect over the panel itself. It would be transparent as opposed to black opaque.

Figure 4:
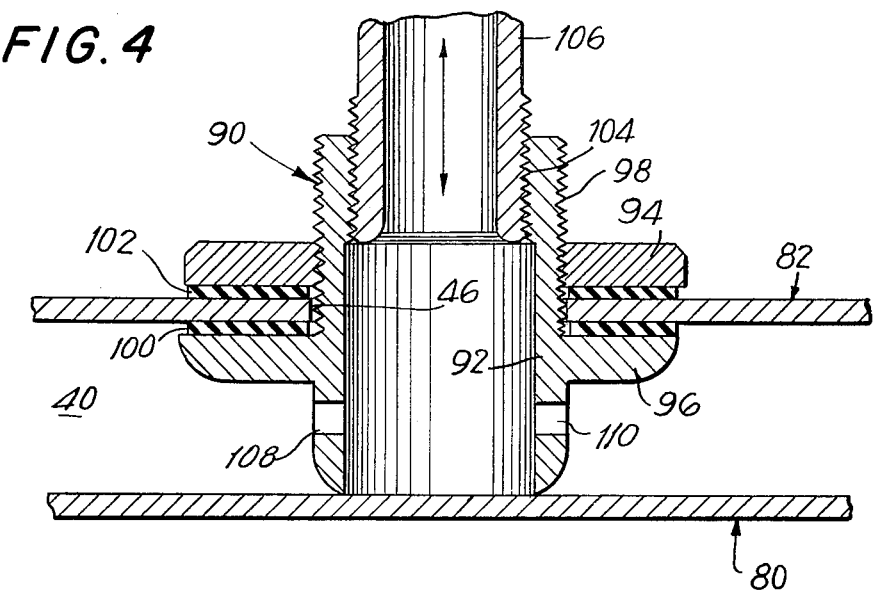
FIG. 4 is a diagrammatic cross-section, illustrating the type of fixture employed in accordance with the invention for constituting an inlet or an outlet.

FIG. 4 illustrates sub-chamber 40 and lower side 80 and upper side 82 described hereinabove. Also illustrated in FIG. 4 is, for example, the opening 46.

FIG. 4 is intended to illustrate the details of a preferred hardware fixture employed to constitute inlet or outlet fixtures in accordance with the invention. Therein it is seen that the fixture 90 includes part 92 and part 94. Part 92 includes a radially and planar circular flange 96, whereas part 94 constitutes the equivalent of such a flange. Part 94 threadably engages part 92 by means of threads 98, as a consequence of which part 94 can be tightened against flange 96 to trap the upper side 82, for example, therebetween. To avoid laceration of the side 82, there are provided rubber or plastic gaskets 100 and 102. These are positioned against the side 82 and between the side 82 and parts 94 and 96.

Part 98 is provided with an interior thread indicated at 104, by means of which connection can be made thereto of a pipe 106, itself provided with threads to engage the thread 104 of part 92.

A portion of the fixture 90 and particularly the part 92 thereof is constituted as a cylinder 108. This cylinder extends into the chamber 42 and constitutes a spacer as between sides 80 and 82. The cylinder 108 is provided with a plurality of radially extending openings 110, wherethrough fluid may flow to constitute an input to or an output from the pouch of the invention. The part or fixture 90 may be formed of metal or plastic or the like.

Figure 5:
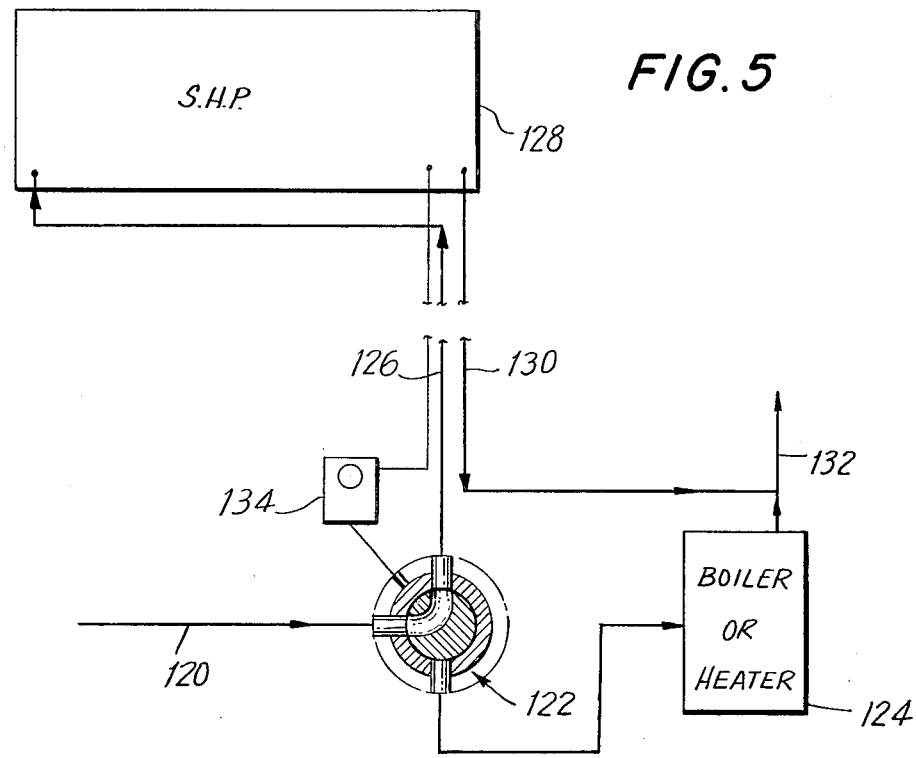
FIG. 5 diagrammatically illustrates a system which may incorporate a unit or system of units of the invention or which may be suitable for the incorporation of other types of collectors.

The pouch of the invention constitutes a collector which may be used in a wide variety of systems. One such system is illustrated in FIG. 5, whereat appears diagrammatically a cold water source coming from a water main indicated, for example, at 120. This source is connected to a two-way valve indicated at 122, which, in turn, is connected to a boiler or heater indicated at 124. The boiler or heater may be of the instantaneous type or may include a hot water heater which incorporates a storage tank. The two-way valve is connected via line 126 to a collector indicated at 128, which may be constituted by a pouch of the invention or a multitude of such pouches. Alternatively, other conventional collectors may be employed. The collector or collectors are connected via line 130 to line 132, which also connects the boiler or heater 124 to the construction which is to employ the thusly heated water.

Incorporated in the system of the invention is a thermostatic valve control 134. The function of the valve is to direct the water selectively to the collector system or to the boiler or heater for the most effective treatment to be utilized in the heating of fluid.

The thermostatic valve control 134 is preferenced to supplying water from the collector 128 and, when the water therein is sufficiently heated, water from the source 120 is passed via line 126 through the collector 128 and via line 130 directly to the structure to be supplied. When the water in collector 128 is insufficiently heated, water from source 120 is passed to the boiler or heater 124, which then supplies water via line 132 to said structure.

Figure 6:
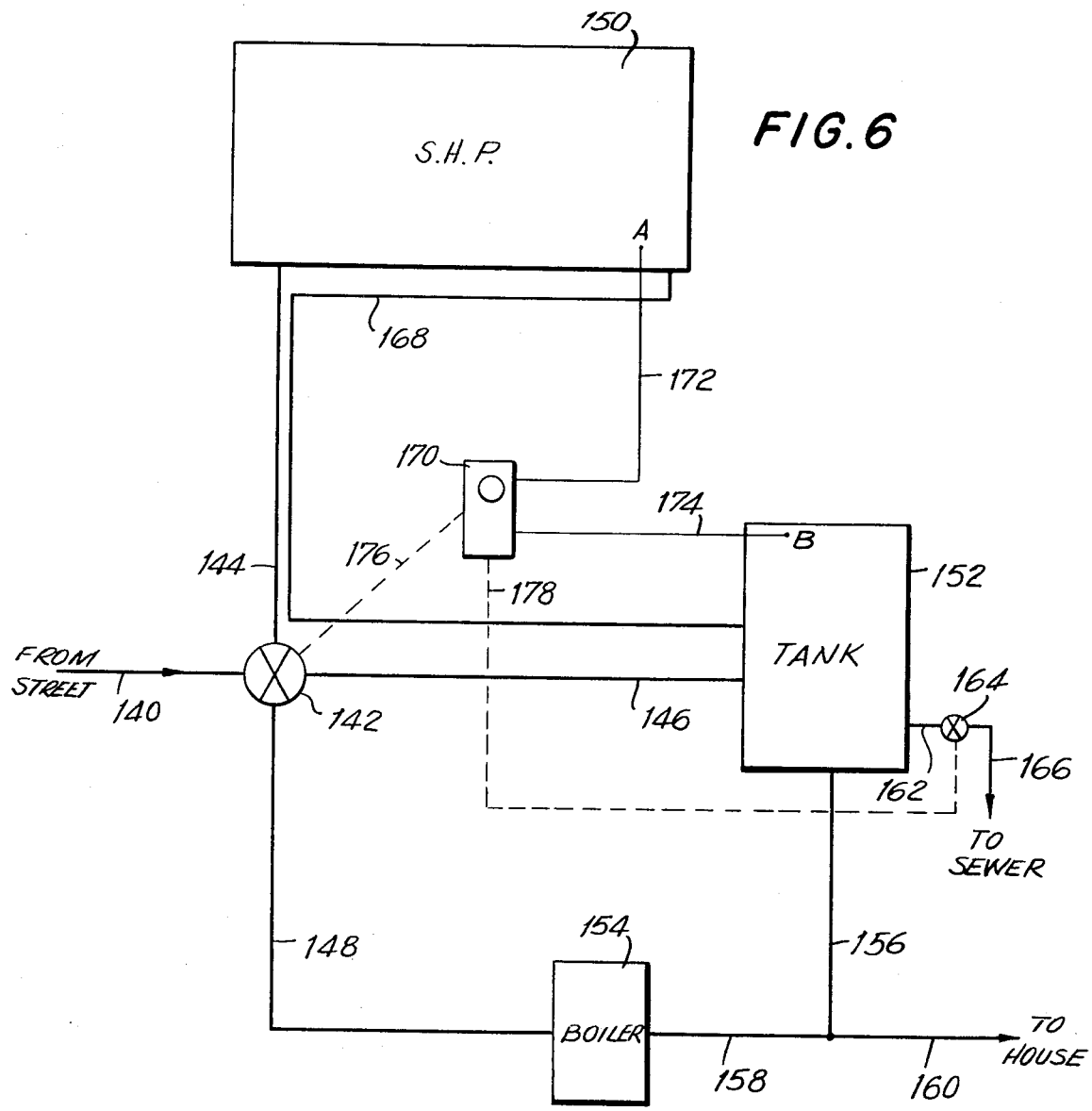
FIG. 6 illustrates a system which is a variation of the system illustrated in FIG. 5.

FIG. 6 demonstrates a system for utilizing pouches of the invention in a system which is a variation of that illustrated in FIG. 5.

In FIG. 6 is illustrated a water source 140 connected via a multiple path valve 142 to lines 144, 146 and 148. Line 144 is connected to collector system 150, consisting of one or more pouches of the invention or of conventional collector panels, whereas line 146 is connected to a storage tank indicated at 152. Line 148 is connected to boiler 154. Lines 156 and 158 respectively connect tank 152 and boiler 154 to line 160 connected to the structure to be supplied with heated water. Tank 152 is connected via line 162 to a discharge valve 164 and thence via line 166 to a discharge. Collector system 150 is connected via line 168 to tank 152. Thermostatic control 170 is connected electrically via lines 172 and 174 to points A and B in solar heating panel 150 or tank 152 respectively. The thermostatic control 170 is connected via lines 176 and 178 to valves 142 and 164 respectively.

When the temperature of the water at point A is greater than the temperature of water at point B by a predetermined temperature difference, valve D is opened to empty tank 152 and draw fluid from collector panel 150, thereby to fill the tank from the solar heating panel. When it is determined that the fluid at point A is cold and that the house requires hot water, valve 142 feeds water through the solar heating panel, if the latter is sufficiently warmed, or through tank 152, if the water in panel 150 is insufficiently heated. If both the water in tank 152 and panel 150 are insufficiently heated, water is directed through the boiler 154, which heats the water in a normal heating operation.

From the above arrangement, adequately heated water is supplied to line 160 from tank 152 or boiler 154 selectively to incorporate in the supply of water to a structure demanding the same the advantageous features of the invention.

It will be understood that the invention further deals with a method of forming a solar heating panel unit. From what has been described hereinabove, it will now be appreciated that the method of the invention comprises laminating a reflective foil to a plastic and connecting the resulting layer peripherally to another layer to form a pouch having an internal chamber which the foil faces.

It will be furthermore understood that the method of the invention preferably incorporates the feature whereby the second said layer indicated above is formed by laminating a matte black polyester to a black polyethylene film. It will still be further appreciated that the method of the invention comprises covering the foil with a polyethylene film, as a consequence whereof the main chamber of the pouch of the invention is bounded by a polyethylene film capable of processing water in a substantially sterile environment.

There will now be obvious to those skilled in the art many modifications and variations of the structures, methods and systems set forth hereinabove. These modifications and variations will not depart from the scope of the invention if defined by the following claims.

What is claimed is:

1. A solar heating panel unit comprising first and second sides connected together along an at least substantially endless path to form a pouch having an internal chamber adapted to accommodate a heat transfer fluid, at least one opening being provided through said first and second sides in a position spaced from said chamber to provide for the mounting of said pouch and access means coupled to at least one of said sides for the supply and removal of said fluid to and from said chamber, said first side including a layer of black polyester, said second side including a lamination of reflective foil and plastic, said foil facing said chamber, said access means including inlet and outlet fixtures coupled to said pouch and including engaged members comprising flanges sandwiching one of said sides therebetween, said members defining a bore communicating with said chamber, one of said members extending into said chamber and including therein a cylindrical part spacing said sides apart and provided with radial openings connecting said bore with said chamber, said panel unit further comprising connecting means in said chamber connecting said first and second sides in offset parallel lines to define a serpentine path in the chamber for the flow of said fluid and also connecting said sides in transverse lines proximate said access means to form subchambers communicating with said serpentine path to divert the flow of fluid between said access means and said serpentine path.

2. A solar heating panel unit as claimed in claim 1 wherein said first side includes a layer of polyethylene on said layer of polyester and facing said chamber.

3. A solar heating panel unit as claimed in claim 1 wherein said second side includes a layer of polyethylene on said foil and facing said chamber.

4. A solar heating panel unit as claimed in claim 3 wherein said first side includes a layer of polyethylene on said layer of polyester and facing said chamber.

5. A solar heating panel unit as claimed in claim 4 wherein said polyethylene is U. V. treated medium density black polyethylene film.

6. A solar heating panel unit as claimed in claim 4 wherein said foil is aluminum, having a thickness of about 0.0003 inches.

7. A solar heating panel unit as claimed in claim 4, comprising polyurethane adhesive bonding the layers of polyethylene and polyester.

8. A solar heating panel unit as claimed in claim 4, comprising polyurethane adhesive bonding the plastic and the layer of polyethylene to said foil.

9. A solar heating panel unit as claimed in claim 1 wherein the plastic of the second side and the polyester of the first side are of U.V. treated P.E.T.

10. A solar heating panel unit as claimed in claim 1 wherein said foil is aluminum, having a thickness of about 0.0003 inches.

11. A solar heating panel unit as claimed in claim 1, comprising connecting means in said chamber connecting said first and second sides to define a serpentine path in the chamber for the flow of said fluid.

12. A system for supplying heated water to a construction comprising at least one unit as claimed in claim 1, source means for supplying cold water, heating means for heating water with localized heating, coupling means for coupling said unit and heating means to said construction, and thermostatically controlled means for selectively coupled said source means to said heating means or said unit.

13. A system for supplying heated water to a construction comprising at least one unit as claimed in claim 1, source means for supplying cold water, heating means for heating water with localized heating a storage tank coupled to said unit, coupling means for coupling said tank and heating means to said construction, and thermostatically controlled means for selectively coupling said source means to said heating means or said tank.

14. A system as claimed in claim 13, comprising discharge means coupled to said tank and thermostatic means to control coupling of said unit to said tank and said discharge means to replace water in said tank with water from said unit when the water in said unit is warmer then the water in the tank by a predetermined temperature difference.

* * * * *